United States Patent
Baugh

(10) Patent No.: US 10,304,591 B1
(45) Date of Patent: May 28, 2019

(54) REEL COOLING METHOD

(71) Applicant: Benton Frederick Baugh, Houston, TX (US)

(72) Inventor: Benton Frederick Baugh, Houston, TX (US)

(73) Assignee: Real Power Licensing Corp., Oklahoma City, OK (US)

( * ) Notice: Subject to any disclaimer, the term of this patent is extended or adjusted under 35 U.S.C. 154(b) by 360 days.

(21) Appl. No.: 14/944,306

(22) Filed: Nov. 18, 2015

(51) Int. Cl.
*H01B 7/42* (2006.01)
*B65H 49/26* (2006.01)

(52) U.S. Cl.
CPC ............. *H01B 7/423* (2013.01); *B65H 49/26* (2013.01)

(58) Field of Classification Search
CPC .................................. H01B 7/423; B65H 49/26
USPC .......................................................... 165/45
See application file for complete search history.

(56) References Cited

U.S. PATENT DOCUMENTS

| | | | | |
|---|---|---|---|---|
| 3,045,099 A * | 7/1962 | Bowman | ................. | E21B 36/04 166/60 |
| 3,131,763 A * | 5/1964 | Kunetka | ................. | E21B 36/04 166/60 |
| 4,078,613 A * | 3/1978 | Hamrick | ................. | E21B 36/02 166/302 |
| 4,185,691 A * | 1/1980 | Tubin | ..................... | E21B 36/04 166/302 |
| 4,411,618 A * | 10/1983 | Donaldson | ............. | E21B 36/02 166/59 |
| 4,574,886 A * | 3/1986 | Hopkins | .................. | C09K 8/60 166/272.3 |
| 4,597,441 A * | 7/1986 | Ware | ...................... | E21B 43/18 166/261 |
| 4,694,907 A * | 9/1987 | Stahl | ...................... | F22B 1/287 166/303 |
| 4,706,751 A * | 11/1987 | Gondouin | ............. | C10G 47/00 166/401 |
| 4,743,175 A * | 5/1988 | Gilmore | ................. | B65H 51/14 166/77.2 |
| 4,805,698 A * | 2/1989 | Baugh | .................. | E21B 17/003 166/188 |
| 5,190,410 A * | 3/1993 | Nunley | .................. | B63B 9/065 405/196 |
| 5,265,677 A * | 11/1993 | Schultz | ................. | E21B 47/011 166/302 |
| 5,275,198 A * | 1/1994 | Vollweiler | ........... | B65H 75/425 137/355.16 |
| 6,935,376 B1 * | 8/2005 | Taylor | .................... | B29C 63/34 138/104 |
| 7,770,646 B2 * | 8/2010 | Klassen | ................ | E21B 43/164 166/303 |
| 9,725,999 B2 * | 8/2017 | Castrogiovanni | ....... | E21B 43/24 |
| 2003/0075361 A1 * | 4/2003 | Terry | ...................... | G01V 3/30 175/61 |
| 2005/0047872 A1 * | 3/2005 | Baugh | .................. | E02B 17/021 405/158 |
| 2007/0193748 A1 * | 8/2007 | Ware | ....................... | E21B 36/02 166/303 |

(Continued)

*Primary Examiner* — Ljiljana V. Ciric
(74) *Attorney, Agent, or Firm* — Phillips Murrah PC; Martin G. Ozinga

(57) ABSTRACT

A method of cooling an offshore reel with multiple layers of umbilical with heat generating electrical current flowing through internal wires by supplying a coolant through a wrap between the layers of the umbilical.

9 Claims, 9 Drawing Sheets

(56) References Cited

U.S. PATENT DOCUMENTS

| | | | |
|---|---|---|---|
| 2009/0189617 A1* | 7/2009 | Burns | E21B 43/24 324/649 |
| 2009/0260823 A1* | 10/2009 | Prince-Wright | C10G 21/22 166/302 |
| 2010/0089584 A1* | 4/2010 | Burns | E21B 43/2401 166/302 |
| 2010/0126727 A1* | 5/2010 | Vinegar | B09C 1/02 166/302 |
| 2010/0181069 A1* | 7/2010 | Schneider | E21B 36/02 166/272.3 |
| 2011/0214858 A1* | 9/2011 | Castrogiovanni | E21B 36/02 166/272.1 |
| 2011/0297374 A1* | 12/2011 | Kuhlman | E21B 43/24 166/272.3 |
| 2014/0332218 A1* | 11/2014 | Castrogiovanni | E21B 43/24 166/302 |

* cited by examiner

REEL COOLING METHOD

BACKGROUND OF INVENTION

1. Field of the Invention

In general, the present invention relates to an apparatus, system and method for cooling coiled lengths positioned on a reel. More particularly, the present invention provides a new and improved reel assembly wherein unwanted heat that may be generated by electricity traveling through the coiled lengths may be cooled by providing a circulation of a coolant across and or through the reel. It is understood that the invention may further include an apparatus, system and method for heating coiled lengths by providing a circulation of heat where it may be desirable to heat the coiled lengths.

2. Description of the Prior Art

Electrical equipment such as dual gradient pumps is operated near the ocean floor by electrical cables or umbilicals from the surface. When this subsea equipment has high power requirements, the heat generating electrical current through the wires can be relatively high. While the cables or umbilicals are in the seawater, they effectively have an infinite volume of cooling fluid available, so cooling is not a problem. The part of the cable or umbilical, which remains at the surface, does not have this cooling source available. It becomes more of a problem when multiple wraps of the electrical cable or umbilical remain on the drum.

Imagine that the equipment is near the seafloor in 10,000 feet of seawater, with all the cable or umbilical removed from the reel spool except part of the inner wrap. That single wrap remaining on the spool is exposed to the air and will have natural cooling around it. Now presume that at another location, the seawater is only 5,000 feet deep, so only half of the cable or umbilical is removed from the reel spool and suspended in the seawater. The remaining cable or umbilical is still on the reel spool and may well be six or seven layers deep. When heat is generated in the middle wraps, it is trapped by the outer wraps and simply built up. The resulting temperature can be damaging to the cable or umbilical to the point of destroying it.

Attempts to resolve this have been to spray ocean water over the cable or umbilical to attempt to cool it. In addition to being messy with water running all over the reel and the deck of the vessel, the salt water is corrosive to the reel and the rig itself. A more serious problem is that the adjacent wraps of the cable will likely actually contact each other, causing the water to simply be shed off the outer wrap rather than penetrating down to where the heat is being generated. Some have discussed injecting the water into the inside of the reel instead, which gives the same problem in the opposite direction.

The problem is serious enough that operators moving from a 10,000' depth location to a 6,000' depth location have cut 4,000' of umbilical off to prevent the heating. As deepwater cables cannot be jointed, the 4,000' of expensive cable had to simply be discarded at a major cost. Additionally, the rig cannot move back to greater depths until a new umbilical is acquired.

Prior art attempts at improvements to this problem have obviously not provided the desired solutions. Thus, there is a need for an apparatus, process and or system that provides a cooling for lengths on a reel to dissipate heat that may occur. The above discussed limitations in the prior art is not exhaustive. The current invention provides an inexpensive, time saving, more reliable apparatus, method and system for cooling a reel where the prior art fails.

SUMMARY OF THE INVENTION

In view of the foregoing disadvantages inherent in the known types of loading systems for offshore hose applications now present in the prior art, the present invention provides a new and improved apparatus, system and method of using an offshore hose loading station. As such, the general purpose of the present invention, which will be described subsequently in greater detail, is to provide a new and improved loading station for use with offshore application which has all the advantages of the prior art devices and none and or fewer of the disadvantages.

It is, therefore, contemplated that the present invention is an apparatus, system and method for use with a reel coiled with lengths that may generate unwanted heat from electricity passing there through by providing a circulation path from one side of the reel to the other that may include a coolant such as but not limited to water, air, chemically treated coolant and so forth. It is also contemplated that the circulation system could be utilized to heat coils where it is desirable to provide heat.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved reel cooling apparatus, system and method of cooling multiple layers of cable and or umbilical without the mess and corrosiveness of having ocean water or even plain water being sprayed over the equipment and may provide the cooling without the necessity of using corrosive salt water as a cooling medium.

Furthermore, an object of the present invention is to provide a new and improved reel cooling apparatus, system and method that may force the cooling fluid to fully follow the spiral of the umbilical to the opposite side of the reel spool rather than short cutting from the right hand spiral of one layer to the left hand spiral of the adjacent layer and only partially cooling the cable and or umbilical.

Another object of the present invention is to provide a new and improved reel cooling apparatus, system and method that may provide cooling of multiple layers of cable and or umbilical with the assurance that the layers are being cooled uniformly, that the effectiveness of the cooling of each layer can be monitored, and to provide the ability to monitor the temperature of the cooling fluid coming from between each layer for the measuring of the effectiveness of the cooling.

It is a further object of the present invention to provide a new and improved reel cooling apparatus, system and method, which is of a durable and reliable construction and may be utilized in numerous types of reels and reel applications.

An even further object of the present invention is to provide a new and improved reel cooling apparatus, system and method, which is susceptible to a low cost of manufacture, installation and labor, which accordingly is then susceptible to low prices of sale to the consuming industry, thereby making such a system economically available to those in the field.

Still another object of the present invention is to provide a new and improved reel cooling apparatus, system and method, which provides all of the advantages of the prior art while simultaneously overcoming some of the disadvantages normally associated therewith.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings and appendices.

DETAILED DESCRIPTION OF INVENTION

Figure 1:
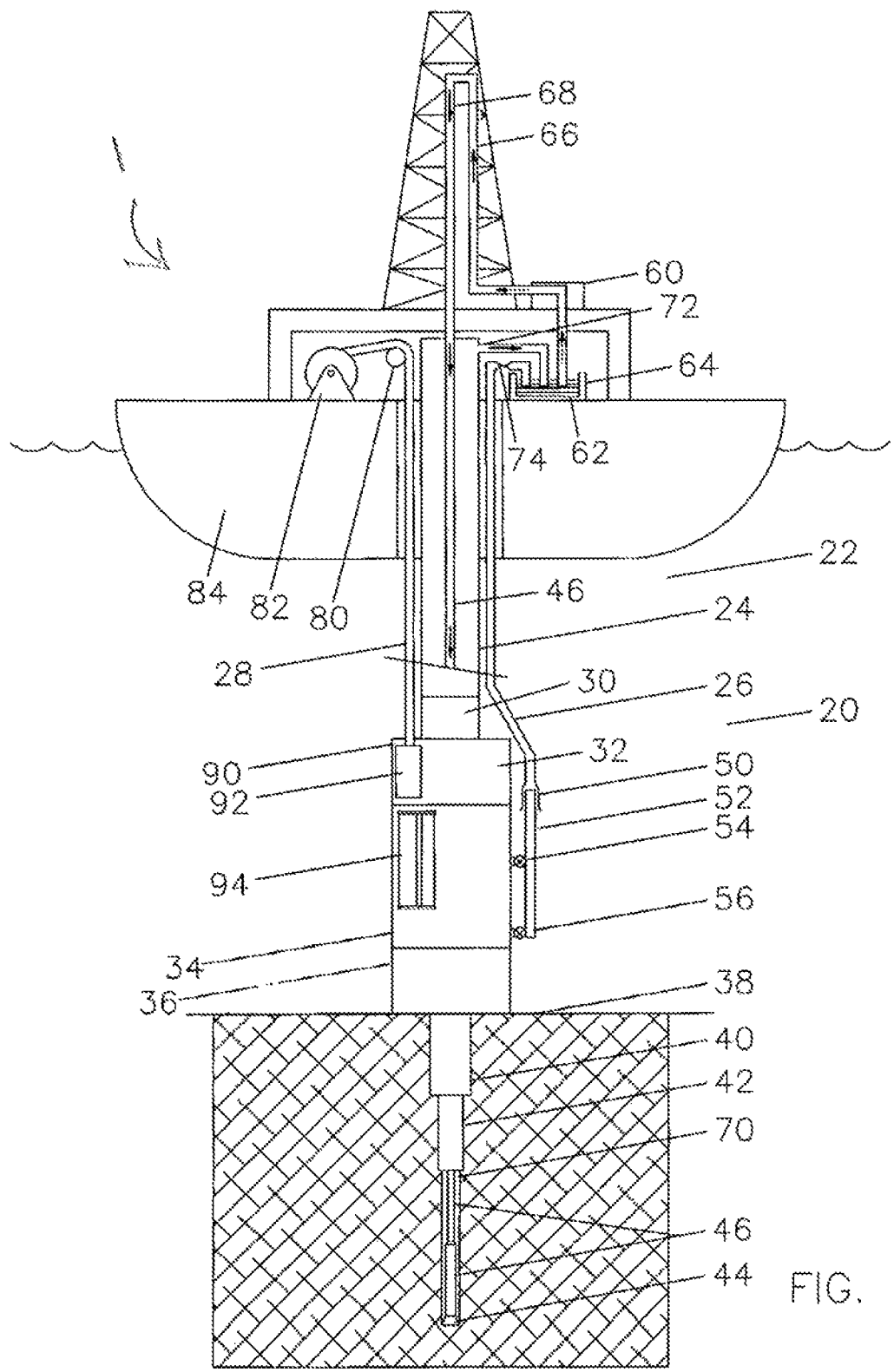
FIG. 1 is a general illustration of a preferred embodiment in accordance with the invention depicting a system of subsea equipment utilizing a reel.

Referring to the illustrations, drawings, and pictures, and to FIG. 1 in particular, reference character 1 generally designates a new and improved reel cooling apparatus, system and method of using same constructed in accordance with the present invention. Invention 1 is generally used in reels with offshore applications but is to be understood that invention 1 may be utilized for non-offshore applications and may be utilized in other operations not associated with vessels. Invention 1 may be utilized with reels in general wherein it is desirable to cool a reel that may have undesirable heating. It is also to be understood that invention 1 may be utilized to heat a reel by utilizing warming fluids and or air instead of cooling fluids and or air where it may be desirable to heat a reel. For purposes of convenience, the reference numeral 1 may generally be utilized for the indication of the invention, portion of the invention, preferred embodiments of the invention and so on.

It is to be understood that an umbilical cable or umbilical may be a cable, which supplies required consumables to an apparatus. It is named by analogy with an umbilical cord. An umbilical can for example supply air and power to a pressure suit or hydraulic power, electrical power and fiber optics to subsea equipment. It is also understood that a cable may be a wire, bundle of wires, cord and so forth.

Referring now to FIG. 1, a view of a complete system for drilling subsea wells 20 is generally shown in order to illustrate a utility of the present invention. Drilling riser 22 is shown with a central pipe 24, outside fluid lines 26, and cable, hose or umbilical 28. Below the drilling riser 22 is a flex joint 30, lower marine riser package 32, lower blowout preventer stack 34 and wellhead system 36 landed on seafloor 38. Below the wellhead system 36, it can be seen that a hole was drilled for a first casing string 40, that first casing string 40 was landed and cemented in place, a hole drilled through the first casing string 40 for a second casing string 42, the second string 42 cemented in place, and a hole is being drilled for a third casing string by drill bit 44 on drill string 46. The lower blowout preventer stack 34 generally comprises a lower hydraulic connector for connecting to the subsea wellhead system 36, usually 4 or 5 ram style blowout preventers, an annular preventer, and an upper mandrel for connection by the connector on the lower marine riser package 32, which are not individually shown but are well known in the art. Below outside fluid line 26 is a choke and kill (C&K) connector 50 and a pipe 52, which is generally illustrative of a choke or kill line. Pipe 52 goes down to valves 54 and 56, which provide flow to or from the central bore of the blowout preventer stack 34 as may be appropriate from time to time. Typically, a kill line will enter the bore of the blowout preventers below the lowest ram and has the general function of pumping heavy fluid to the well to overburden the pressure in the bore or to "kill" the pressure. The general implication of this is that the heavier mud cannot be circulated into the well bore, but rather must be forced into the formations. A choke line will typically enter the well bore above the lowest ram and is generally intended to allow circulation in order to circulate heavier mud into the well to regain pressure control of the well. Normal circulation is down the drill string 46, through the drill bit 44.

In normal drilling circulation, mud pumps 60 take drilling mud 62 from mud tank 64. The drilling mud 62 will be pumped up a standpipe 66 and down upper end 68 of the drill string 46. It will be pumped down the drill string 46, out the drill bit 44, and return up annular area 70 between the outside of the drill string 46 and the bore of the hole being drilled, up the bore of the casing string 42, through the subsea wellhead system 36, the lower blowout preventer stack 34, the lower marine riser package 32, up the drilling riser 22, out a bell nipple 72 and back into the mud tank 64. During situations in which an abnormally high pressure from the formation has entered the well bore, the thin walled central pipe 24 is typically not able to withstand the pressures involved. Rather than making the wall thickness of the relatively large bore drilling riser thick enough to withstand the pressure, the flow is diverted to choke line or outside fluid line 26. It is more economical to have a relatively thick wall in a small pipe to withstand the higher pressures than to have the proportionately thick wall in the larger riser pipe. When higher pressures are to be contained, one of the annular or ram blowout preventers are closed around the drill pipe and the flow coming up the annular area 70 around the drill pipe is diverted out through choke valve 54 into the pipe 52. The flow passes up through C&K connector 50, up pipe 52, which is attached to the outer diameter of the central pipe 24, through choking means illustrated at 74, and back into the mud tanks 64.

On the opposite side of the drilling riser 22 is shown cable, hose or umbilical 28 coming across a sheave 80 from a reel 82 on vessel 84. The umbilical 28 is shown characteristically entering top 90 of the lower marine riser package 32. These cables typically carry hydraulic, electrical, multiplex electrical, or fiber optic signals. Typically, there are at least two of these systems for redundancy, which are characteristically painted yellow and blue. If reel 82 is a control umbilical, as the umbilical 28 enters the top 90 of the lower marine riser package 32, it typically enters a control pod 92 to deliver their control signals. If reel 82 is a hydraulic reel, hydraulic supply is delivered to one or more hydraulic accumulators 94 located on the lower marine riser package 32 or the lower blowout preventer stack 34 to store hydraulic fluid under pressure until needed. If reel 82 is a power umbilical as is the case in the present invention, umbilical 28 enters the top of a package to be powered, such as a dual gradient pumping system. In the case of a dual gradient pumping system, a large amount of electrical power is needed to pump the drilling fluid returns back up a choke or kill line and minimize the effect of the head pressure from the drilling mud within the drilling riser 22 on the formations. The collective heating of the large amount of electrical power on umbilical remaining on the drum of reel 82 is the problem discussed herein.

Figure 2:
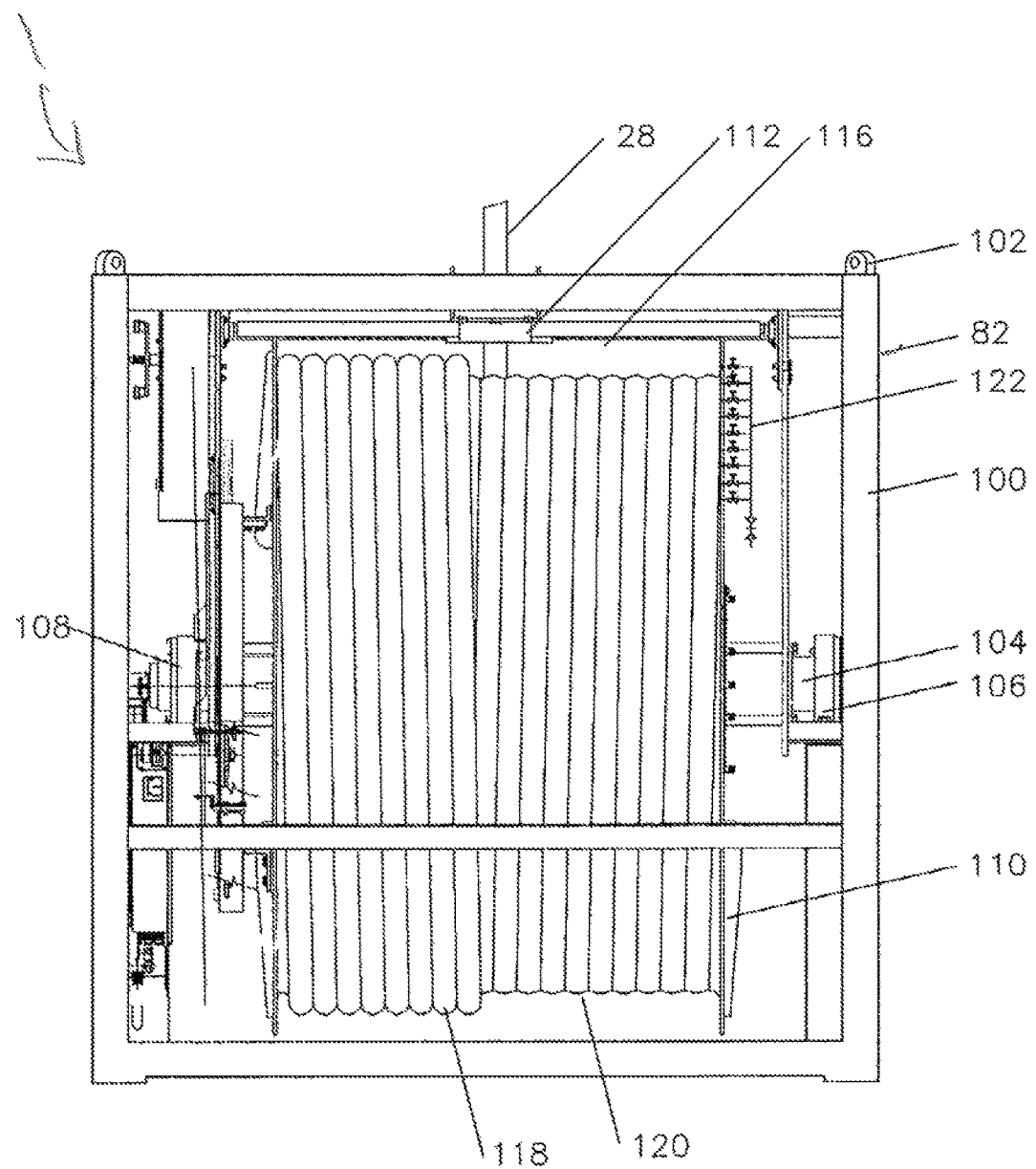
FIG. 2 is a front view of a reel in accordance with a preferred embodiment of the invention.

Referring now to FIG. 2, reel 82 has frame 100, lifting pad eyes 102, main shaft 104, main shaft bearings 106 and 108, spool 110, umbilical 28 being, which will go over sheave 80 and then subsea, level winding means 112 to control the relaying of the umbilical 28 on the spool 110 when being recovered, and leadscrew 116 which controls the movement of level winding means 112. The outer wrap 118 of umbilical 28 on spool 110 is shown with a right hand spiral. Next lower wrap 120 is shown going back the opposite direction with a left hand spiral.

The umbilical 28 is shown in the worst case, being fully loaded as would be in testing on land before subsea deployment. In this case, the maximum amount of cable will be on the spool, with the most potential for heat buildup when doing qualification testing. In subsea operations, at least some of the layers will be removed. Valve assembly 122 will provide a supply of cooling air to layers of the umbilical as will be discussed later.

Figure 3:
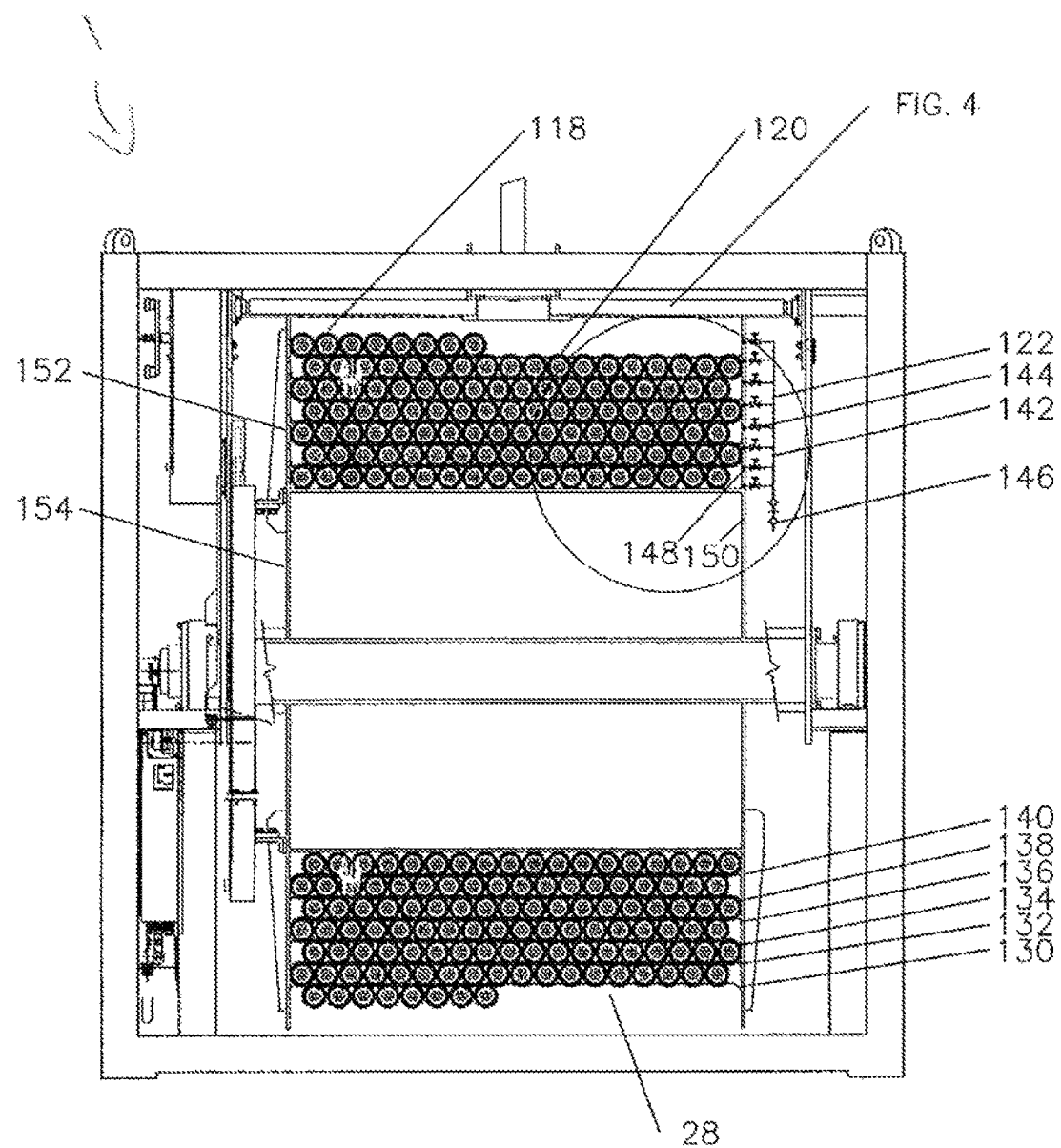
FIG. 3 is a partial cross sectional front view of the reel in FIG. 1 with the spool and umbilical half sectioned for visibility in accordance with a preferred embodiment of the invention.

Referring now to FIG. 3, a similar view as was shown in FIG. 2 is seen, with the spool 110 and umbilical 28 sectioned in half for visibility. Material layers and or barriers 130, 132, 134, 136, 138 and 140 are shown between the successive layers of umbilical 28 to functionally isolate one layer from the adjacent layers. Barriers 130, 132, 134, 136, 138 and 140 can be a variety of material with plastic shipping wrap being the most likely to be used as it is readily available and wrapping the umbilical is similar to wrapping large boxes to ship. It can be clear for good umbilical visibility or colored to provide protection for the umbilical from ultraviolet radiation. Valve assembly 122 is shown comprised of a piping manifold 142, valves 144 generally mounted between successive wraps of umbilical 28, and air connection 146 for an air supply to be connected. Valves 144 are mounted on threaded holes 148 to deliver air through flange 150 of spool 110 and holes 152 penetrate flange 154 of spool 110 to vent air out of the other side. In this way, air will be input to one side of the spool 110, flow over the wraps of umbilical for which any of the valves 144 are opened, and then flow out the other side. The change in temperature of the air entering through flange 150 to the flange 154 will give an indication of the effectiveness of the system.

Figure 4:
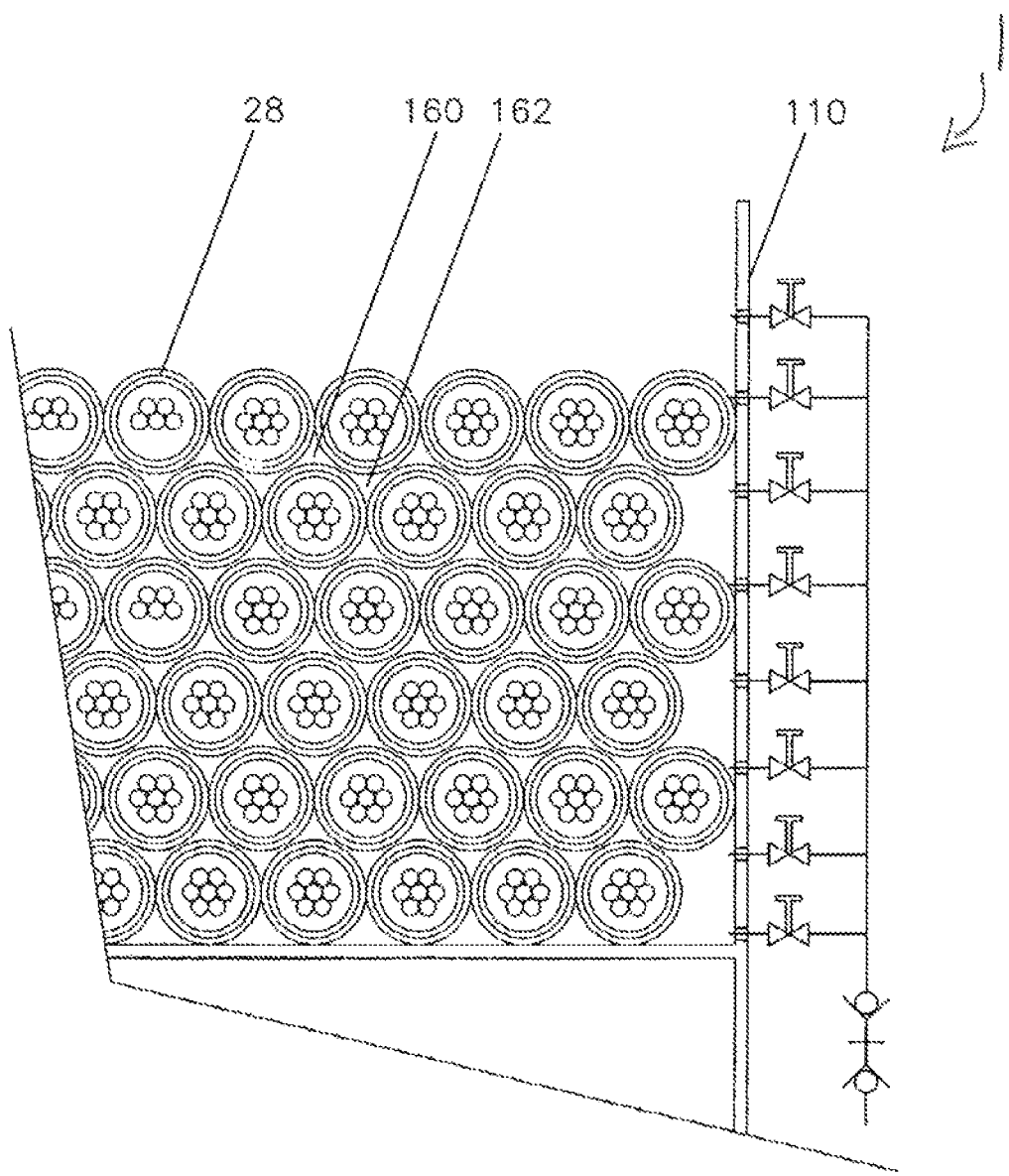
FIG. 4 is a partial cross sectional front view of a reel in accordance with a preferred embodiment of the invention.

Referring now to FIG. 4, the area generally identified in FIG. 3 is shown, except the barriers 130, 132, 134, 136, 138 and 140 are not shown. This is how this would appear without the benefit of the present invention. The wrapping of the umbilical 28 is very neat in this view, a situation, which can only happen at one place around the circumference of the spool 110. Of particular interest are triangular shaped flow areas 160 and 162, which are gaps between wraps of the umbilical 28 in which cooling air can flow. In this view, they appear to be completely isolated from each other; however, they are not.

Figure 5:
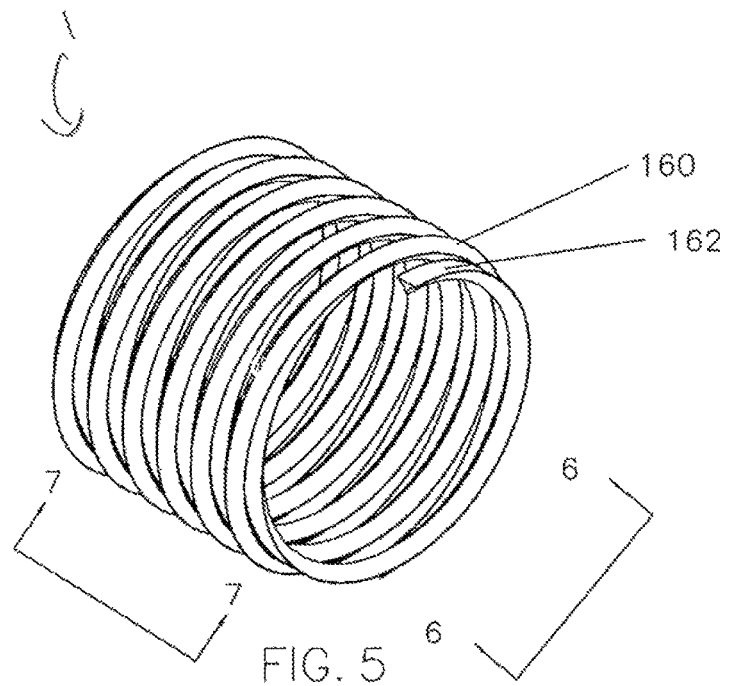
FIG. 5 is a perspective view of the triangular shaped air gap flow areas, which may exist between the wraps of the umbilical in accordance with a preferred embodiment of the invention.

Referring now to FIG. 5, triangular shaped flow areas 160 and 162 are shown in perspective view. Triangular shaped flow area 160 is shown to have a left hand lead whereas triangular shaped flow area 162 is shown to have a right hand lead.

Figures 6, 7:
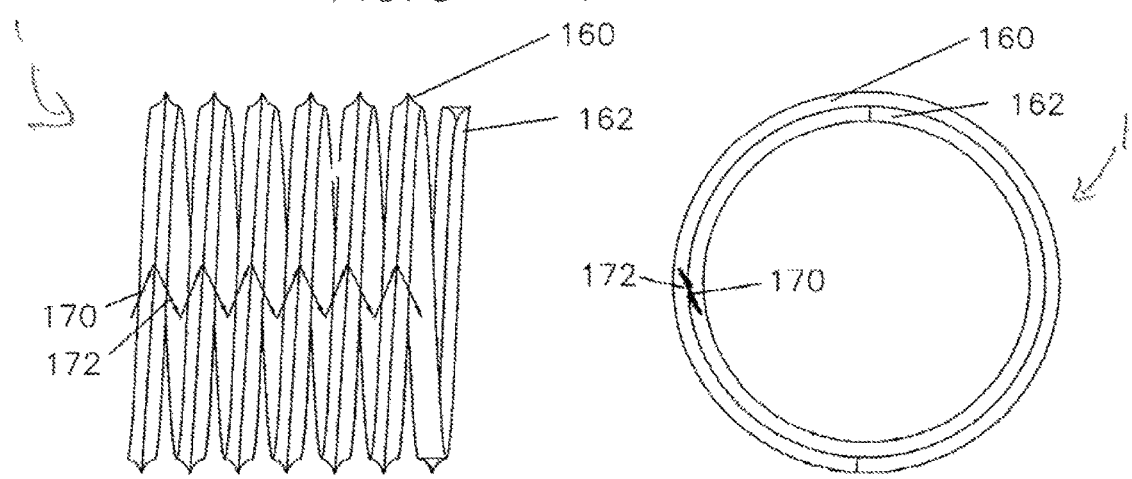
FIG. 6 is a view of FIG. 5 taken along view lines "6-6" in accordance with a preferred embodiment of the invention.
FIG. 7 is a view of FIG. 5 taken along view lines "7-7" in accordance with a preferred embodiment of the invention.

Referring now to FIG. 6, triangular shaped flow areas 160 and 162 are shown in end view and each are shown to be full circles as they wrap around the circumference of the spool 110. As can be seen in FIG. 5 and FIG. 6, although there can be some points of isolation between triangular shaped flow areas 160 and 162, for most of the circumference, they are in communication with each other.

Referring now to FIG. 7, when cooling air is introduced, it can follow the long spiral around the path of triangular shaped flow area 160 or 162, or as triangular shaped flow areas 160 and 162 communicate with each other most of the time, it can simply "short circuit" and make a direct path across the spool. Arrows 170 and 172 are illustrating that the air will flow over one umbilical and under the other as required.

Referring again to FIG. 6, arrows 170 and 172 are again shown illustrating that the air will flow over one umbilical and under the other as required. This will provide some limited cooling, but there can remain portions of umbilical, which are completely uncooled.

Figure 8:
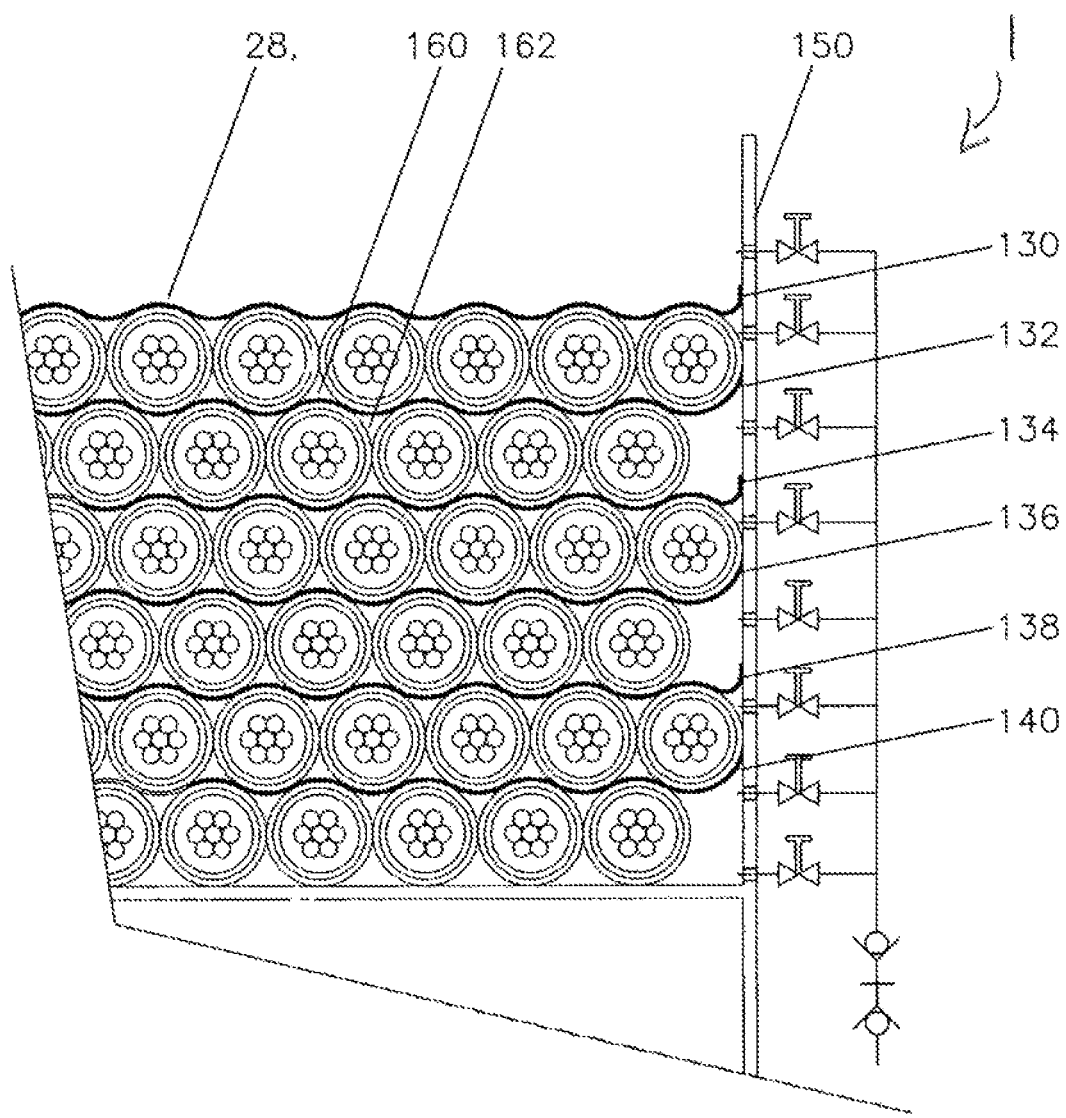
FIG. 8 is a partial cross sectional front view of a reel of FIG. 4 generally depicting added air flow restriction barriers in accordance with a preferred embodiment of the invention.

Referring now to FIG. 8, a view similar to FIG. 4 is shown, except with barriers 130, 132, 134, 136, 138 and 140 in place. Barriers 130, 132, 134, 136, 138 and 140 positively divide the triangular shaped flow areas 160 and 162 into segregated areas such that when air enters through flange 150, it must follow the spiral of the umbilical 28 all the way to the other side of the spool 110. This means that the wrap of umbilical 28 will be uniformly cooled from one side to the other.

Figure 9:
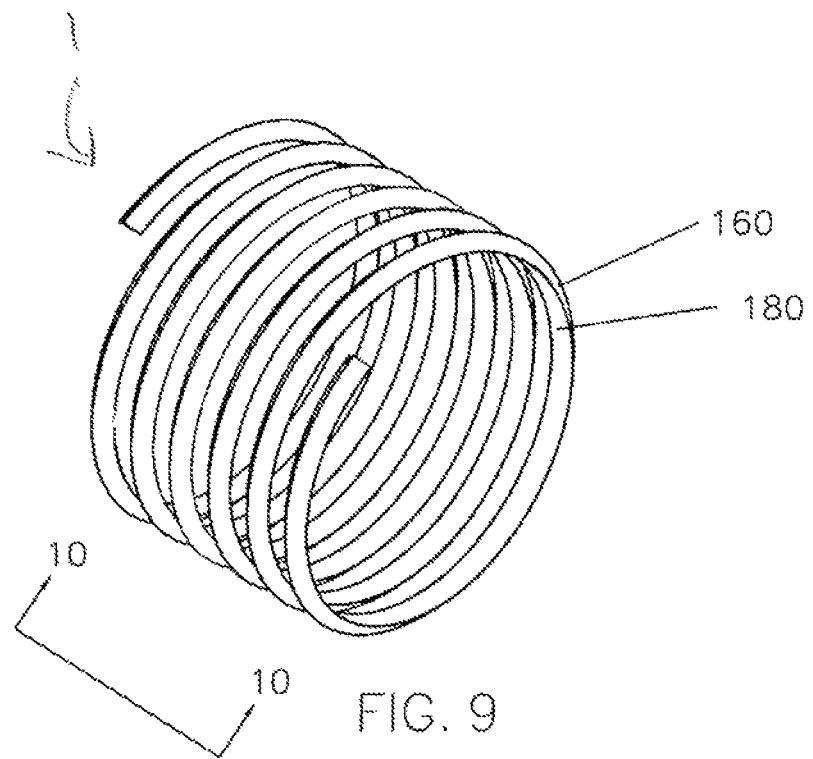
FIG. 9 is a perspective view of the triangular shaped air gap flow areas, which may exist between the wraps of the umbilical and outside the flow restriction barrier introduced in FIG. 8 in accordance with a preferred embodiment of the invention

Referring now to FIG. 9, a perspective view of triangular shaped flow area 160 is shown having a generally flat internal diameter 180.

Figure 10:
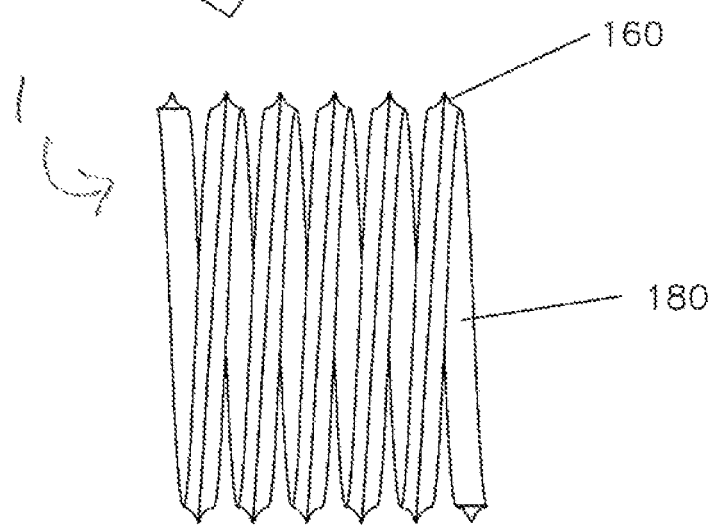
FIG. 10 is a view of FIG. 9 taken along lines vie "10-10" in accordance with a preferred embodiment of the invention.

Referring now to FIG. 10 a view of FIG. 9 is shown taken along lines "10-10" of FIG. 9, and again is showing that triangular shaped flow area 160 has a generally flat internal diameter 180.

Figure 11:
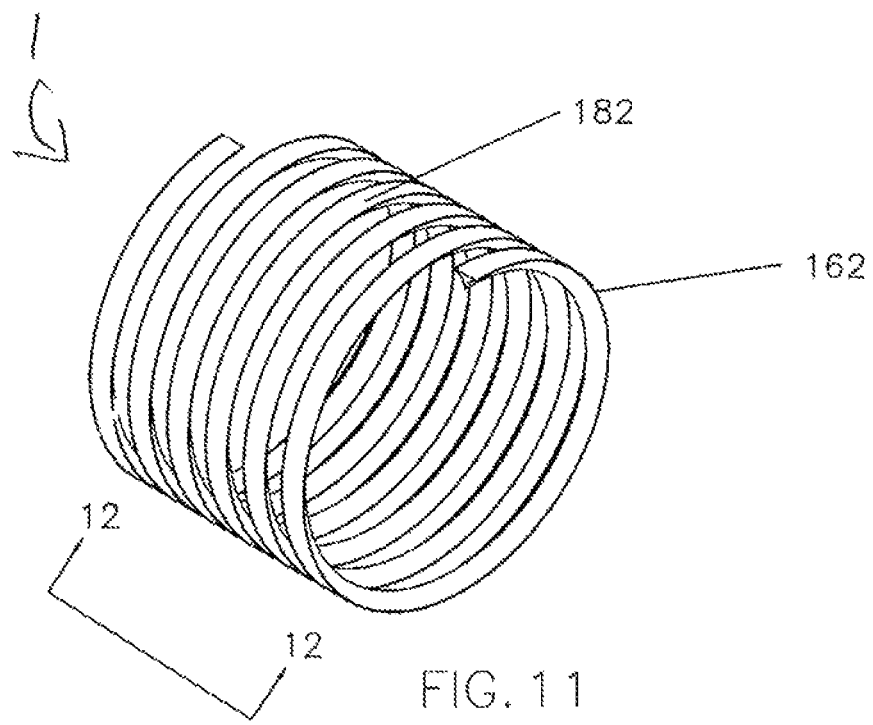
FIG. 11 is a perspective view of the triangular shaped air gap flow areas, which may exist between the wraps of the umbilical and inside the flow restriction barrier introduced in FIG. 8 in accordance with a preferred embodiment of the invention.

Referring now to FIG. 11, a perspective view of triangular shaped flow area 162 is shown having a generally flat outer diameter 182.

Figure 12:
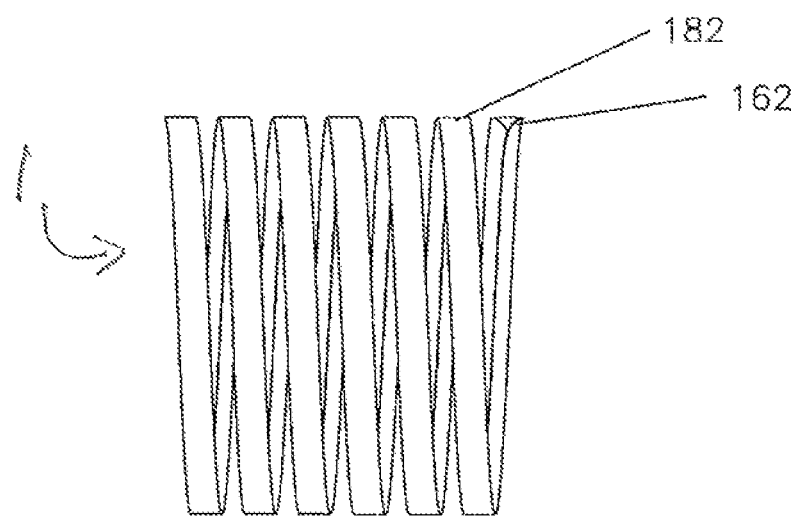
FIG. 12 is a view of FIG. 11 taken along view lines "12-12" in accordance with a preferred embodiment of the invention.
Figure 13:
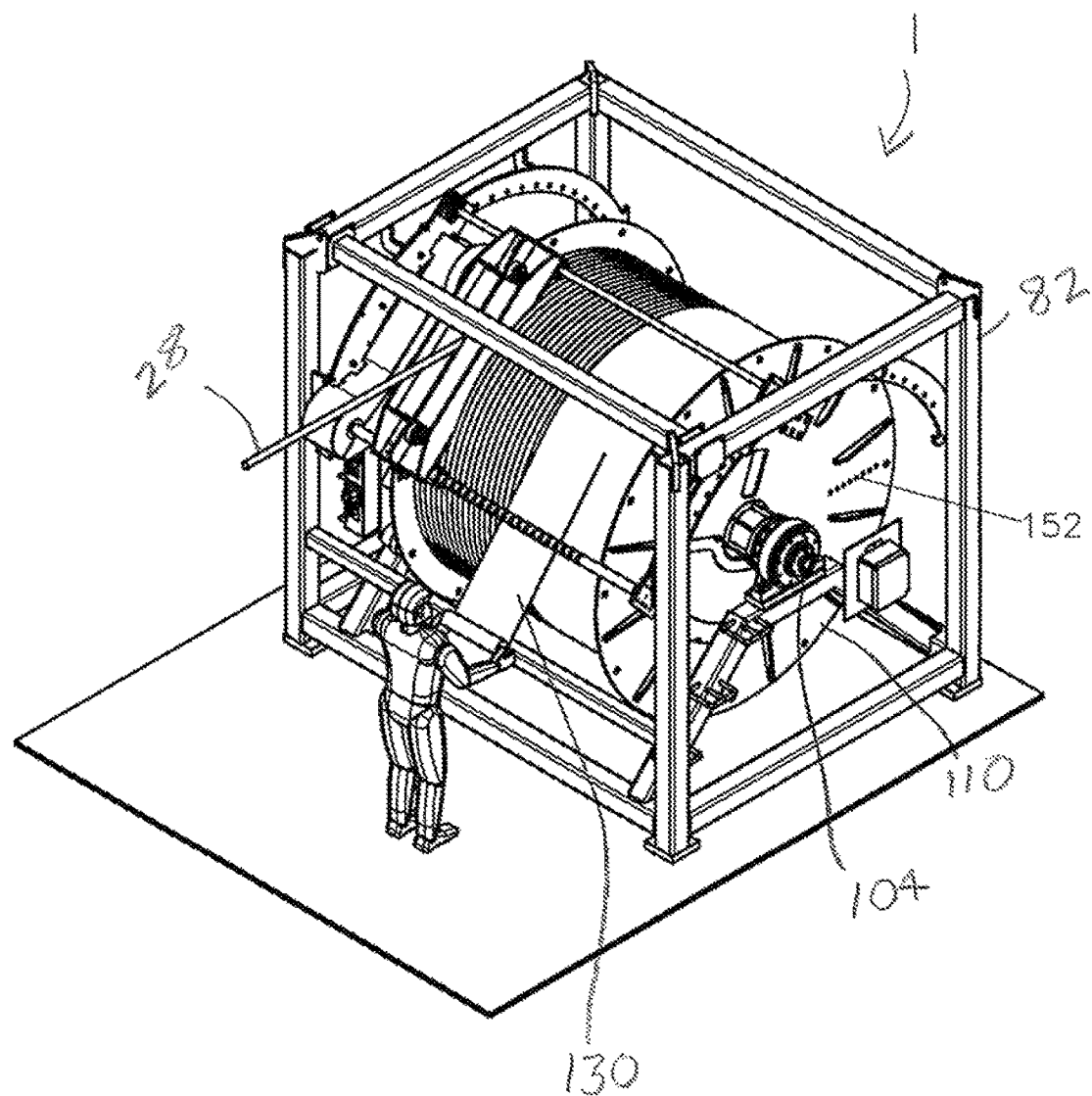
FIG. 13 is a general perspective view of an individual placing air flow restriction barriers in accordance with a preferred embodiment of the invention.

Referring now to FIG. 12 a view of FIG. 11 is shown taken along lines "12-12" of FIG. 11, and again is showing that triangular shaped flow area 162 has a generally flat outer diameter 182. Again, the generally flat outer diameter 182 is in communication with the generally flat inner diameter 180 for most of the circumference around the spool 110.

It is therefore understood that the invention may be an offshore reel with multiple layers of umbilical with heat generating electrical current flowing through internal wires, the method of removing the heat from said umbilical comprising supplying a coolant into the first side said reel at one or more levels at proximately the interface levels between levels of said umbilical; venting said coolant from the second side of said reel at one or more levels; further comprising wrapping one or more layers of said umbilical with a material layer to force said coolant to follow the wrap of said umbilical; wherein said coolant is air; wherein said coolant is liquid; wherein said liquid is water; further comprising monitoring the temperature of said coolant; further comprising providing one or more valves to allow the flow of coolant to be selectively distributed said interface levels of said umbilical; further comprising said coolant is provided with a positive pressure for causing said coolant to flow from said first side of said reel to said second side of said reel; further comprising said coolant is provided with a negative pressure for causing said coolant to flow from said second side of said reel to said first side of said reel; and further comprising continuing to wrap said umbilical with said material layer to provide said reel with protection from ultraviolet radiation.

It is also understood that the invention may be a reel comprising a frame; a shaft rotatably disposed on said frame; a spool disposed on said shaft having a first circular flange having a diameter perpendicular to said shaft, an outside surface of said first flange, an inside surface of said first flange, at least one hole through said first circular flange between said outside surface and said inside surface along said diameter, and a second flange wherein said first circular flange and said second flange are adapted for positioning coiled lengths between said first circular flange and said second flange; a vent assembly having a piping manifold attached to said at least one hole, and a valve in communication with said manifold for selectively providing circulation through said spool.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Changes may be made in the combinations, operations, and arrangements of the various parts and elements described herein without departing from the spirit and scope of the invention. Furthermore, names, titles, headings and general division of the aforementioned are provided for convenience and therefore, should not be considered limiting.

What is claimed is:

1. On an offshore reel with multiple layers of umbilical with heat generating electrical current flowing through internal wires, a method of removing the heat from said umbilical comprising:
   supplying a coolant into a first side of said reel at one or more levels of said umbilical;
   venting said coolant from a second side of said reel at said one or more levels of said umbilical; and
   wrapping one or more layers of said umbilical with material layers to force said coolant to follow said material layers.

2. The method of claim 1 wherein said coolant is air.

3. The method of claim 1 wherein said coolant is liquid.

4. The method of claim 3 wherein said liquid is water.

5. The method of claim 1 further comprising monitoring the temperature of said coolant.

6. The method of claim 1 further comprising providing one or more valves to allow the flow of coolant to be selectively distributed to said one or more levels of said umbilical.

7. The method of claim 1 further comprising providing said coolant with a positive pressure for causing said coolant to flow from said first side of said reel to said second side of said reel.

8. The method of claim 1 further comprising providing said coolant with a negative pressure for causing said coolant to flow from said second side of said reel to said first side of said reel.

9. The method of claim 1 further comprising continuing to wrap said umbilical with said material layers to provide said reel with protection from ultraviolet radiation.

* * * * *